(12) United States Patent
Murthy Bellur et al.

(10) Patent No.: US 11,952,930 B2
(45) Date of Patent: Apr. 9, 2024

(54) INVERTER-BASED EXHAUST AFTERTREATMENT THERMAL MANAGEMENT APPARATUSES, METHODS, SYSTEMS, AND TECHNIQUES

(71) Applicant: Cummins Inc., Columbus, IN (US)

(72) Inventors: Subbarao Dakshina Murthy Bellur, Minneapolis, MN (US); Thomas A. Dollmeyer, Columbus, IN (US); Jennifer Rumsey, Greenwood, IN (US); Bradford K. Palmer, Ham Lake, MN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/169,898

(22) Filed: Feb. 8, 2021

(65) Prior Publication Data

US 2021/0164372 A1    Jun. 3, 2021

Related U.S. Application Data

(63) Continuation of application No. PCT/US2018/058319, filed on Oct. 31, 2018.

(51) Int. Cl.
*F01N 3/00* (2006.01)
*F01N 3/027* (2006.01)
(Continued)

(52) U.S. Cl.
CPC .......... *F01N 3/027* (2013.01); *F01N 3/2013* (2013.01); *F01N 9/002* (2013.01); *F01N 2250/02* (2013.01)

(58) Field of Classification Search
CPC ........ F01N 3/027; F01N 3/2013; F01N 9/002; F01N 2250/02; F01N 2240/16; F01N 2900/1602; B60K 2006/4825; B60K 6/48
See application file for complete search history.

(56) References Cited

U.S. PATENT DOCUMENTS

| 5,177,677 | A | * | 1/1993 | Nakata | .................. | H02J 7/1492 320/145 |
| 5,719,484 | A | * | 2/1998 | Taniguchi | ............. | H02J 7/1438 322/20 |

(Continued)

FOREIGN PATENT DOCUMENTS

| JP | 10313505 | 11/1998 |
| WO | 2007064381 | 6/2007 |

OTHER PUBLICATIONS

International Search Report and Written Opinion, PCT Appln. No. PCT/US18/58319, 13 pgs., dated Jan. 4, 2019.

(Continued)

*Primary Examiner* — Matthew T Largi
(74) *Attorney, Agent, or Firm* — Taft Stettinius & Hollister LLP

(57) ABSTRACT

One exemplary embodiment is a vehicle system comprising an engine, an exhaust aftertreatment system including a heating element, an electric machine configured to selectably operate as a motor or a generator, an inverter module including a plurality of inverter phase legs and an auxiliary leg, and an electronic control system in operative communication with the inverter module and the exhaust aftertreatment system. The electronic control system is configured to evaluate whether the electric machine is operating as a generator, selectably operate the plurality of inverter phase legs to rectify AC power received from the electric machine, evaluate whether to heat one or more components of the exhaust aftertreatment system, and selectably operate the auxiliary leg to provide rectified power from the inverter legs to one or more electrical heating elements thermally coupled with the one or more components exhaust aftertreatment system effective to heat the one or more components.

21 Claims, 4 Drawing Sheets

(51) Int. Cl.
*F01N 3/20* (2006.01)
*F01N 9/00* (2006.01)

(56) References Cited

U.S. PATENT DOCUMENTS

| | | | |
|---|---|---|---|
| 6,003,304 A | 12/1999 | Swanson et al. | |
| 6,252,381 B1 * | 6/2001 | Schenk | F02N 11/04 |
| | | | 363/145 |
| 6,381,955 B1 | 5/2002 | Morganti et al. | |
| 6,717,386 B1 * | 4/2004 | Kanasugi | H02M 7/217 |
| | | | 322/27 |
| 6,912,848 B2 | 7/2005 | Bedapudi | |
| 6,940,259 B2 * | 9/2005 | Suzuki | H02P 9/00 |
| | | | 363/40 |
| 7,705,568 B2 * | 4/2010 | Taniguchi | H02P 9/006 |
| | | | 322/29 |
| 8,326,476 B2 * | 12/2012 | Kamaga | B60L 3/0046 |
| | | | 320/128 |
| 8,327,623 B2 | 12/2012 | Raman | |
| 8,473,177 B2 | 6/2013 | Madurai Kumar et al. | |
| 8,490,740 B2 * | 7/2013 | Hashimoto | B60W 10/26 |
| | | | 60/274 |
| 8,630,759 B2 | 1/2014 | Bauerle | |
| 8,720,185 B2 | 5/2014 | Webb et al. | |
| 8,919,100 B2 | 12/2014 | Verbrugge et al. | |
| 9,975,543 B1 | 5/2018 | Norris et al. | |
| 2009/0277705 A1 * | 11/2009 | Ichikawa | B60L 50/16 |
| | | | 180/65.21 |
| 2010/0145562 A1 * | 6/2010 | Moran | B60K 6/48 |
| | | | 180/65.28 |
| 2011/0000194 A1 * | 1/2011 | Gonze | F01N 3/103 |
| | | | 60/297 |
| 2012/0173062 A1 * | 7/2012 | Madurai Kumar | B60W 10/08 |
| | | | 903/903 |
| 2013/0310215 A1 * | 11/2013 | Kitano | B60K 6/445 |
| | | | 180/65.265 |
| 2014/0102187 A1 | 4/2014 | Andreae | |
| 2016/0114790 A1 * | 4/2016 | Bruce | B60L 1/02 |
| | | | 903/905 |
| 2016/0359328 A1 | 12/2016 | Hunt et al. | |
| 2017/0043757 A1 | 2/2017 | Sujan et al. | |

OTHER PUBLICATIONS

European Search Report, EP Appln. No. 18938961.2, 5 pgs., dated Jul. 27, 2022.

* cited by examiner

INVERTER-BASED EXHAUST AFTERTREATMENT THERMAL MANAGEMENT APPARATUSES, METHODS, SYSTEMS, AND TECHNIQUES

CROSS-REFERENCE TO RELATED APPLICATIONS

The present application is a continuation of International Patent Application No. PCT/US18/58319 filed on Oct. 31, 2018, the content of which is incorporated herein by reference.

BACKGROUND

The present application relates generally to exhaust aftertreatment thermal management apparatuses, methods, systems, and techniques. Exhaust aftertreatment systems may include one or more temperature-sensitive catalysts whose temperature should be maintained at or above a desired temperature or within a desired temperature range to avoid catalyst underperformance and increased emissions or to provide regeneration of a catalyst. Examples of temperature-sensitive catalysts include selective catalytic reduction (SCR) catalysts, particulate filters such as a diesel particulate filter (DPF), selective catalytic reduction particulate filter (SCRF) catalysts, oxidation catalysts, and three-way catalysts. Under some engine operating conditions, a temperature-sensitive catalyst may not be able to achieve a desired operating temperature without being provided with additional heat beyond what is provided by engine-out exhaust temperature. A number of proposals have been made to provide augmented heating of catalysts. Some have proposed providing hydrocarbons to engine exhaust which can react with exhaust oxygen to generate additional heat, for example, by in-cylinder injection or post-cylinder injection of additional fuel. Some have proposed use of electrical heating systems to increase catalyst temperature. Heretofore, conventional approaches have suffered from a number of drawbacks, limitations, shortcomings and undesirable results including those respecting fuel economy, parasitic losses, power availability, reliability, safety, and system complexity. There remains a substantial need for the unique apparatuses, methods, systems, and techniques disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

Exemplary embodiments include unique apparatus, methods, systems and techniques for inverter-based aftertreatment thermal management. Further embodiments, forms, objects, features, advantages, aspects, and benefits shall become apparent from the following description and drawings.

DETAILED DESCRIPTION OF ILLUSTRATIVE EMBODIMENTS

Figure 1:
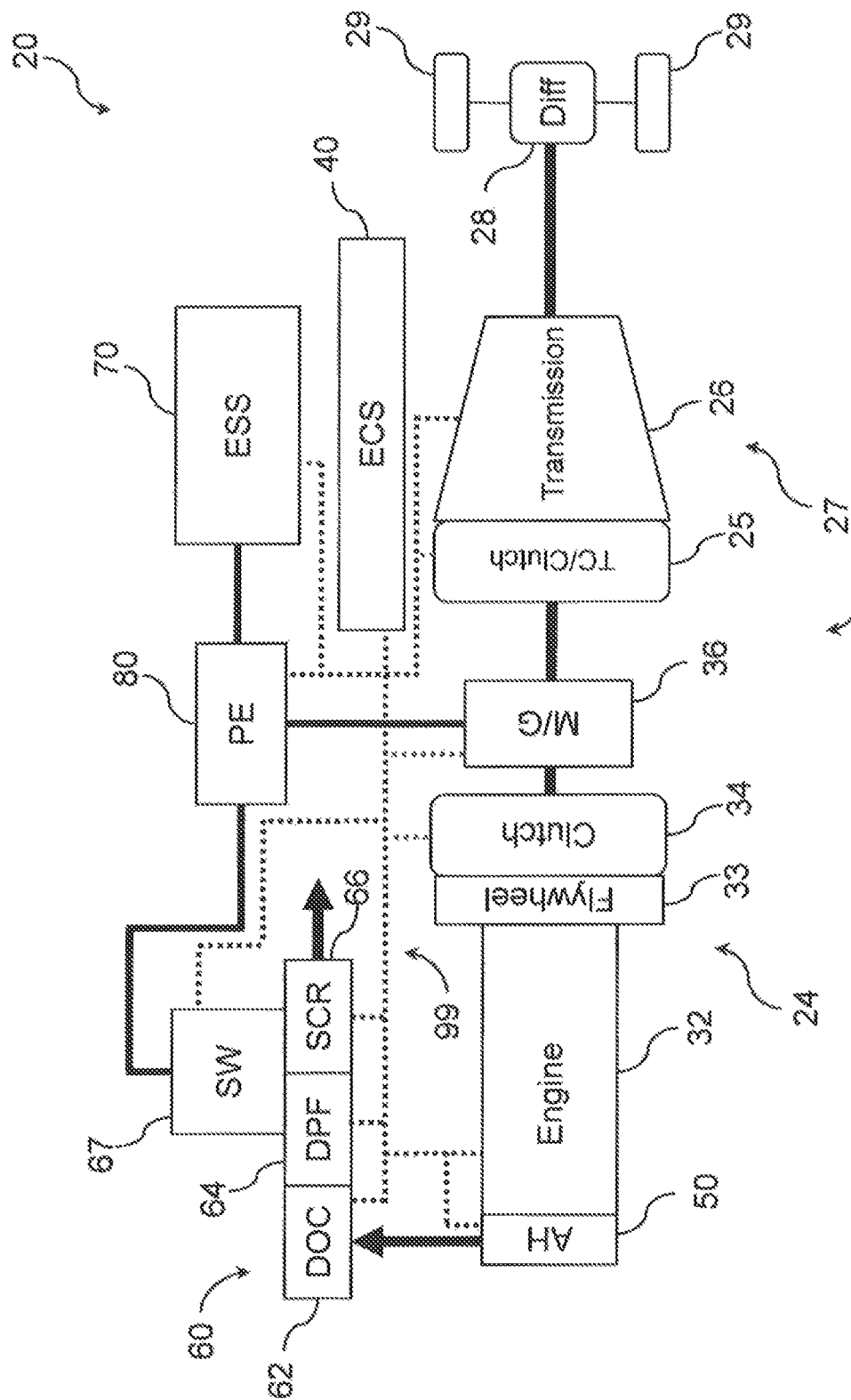
FIG. 1 is a schematic diagram illustrating certain aspects of an exemplary vehicle system.

With reference to FIG. 1, there is illustrated, a partially diagrammatic view of an exemplary vehicle 20. In the illustrated embodiment, vehicle 20 includes hybrid powertrain system 22 which includes a driveline 27 and a hybrid power system 24. Driveline 27 includes a torque converter or transmission clutch 25, a transmission 26, a differential 28, and ground engaging wheels 29. It should be appreciated that in this embodiment, the propulsion of the vehicle is provided by the ground engaging wheels 29 which are provided as rear wheels; however, in other applications, front-wheel drive, four-wheel drive, and all-wheel drive approaches are contemplated. In one form, vehicle 20 is a form of on-road bus, delivery truck, a service truck or the like. In other forms, vehicle 20 may be of a different type, including other types of on-road or off-road vehicles. In still other embodiments it may be a marine vehicle (boat/ship) or another type of vehicle. In yet other embodiments, rather than a vehicle, hybrid powertrain system 22, including the hybrid power system 24 is applied to stationary applications, such as an engine-driven generator (a genset), a hybrid system-driven pump, or the like to name several possibilities.

Hybrid power system 24 includes internal combustion engine 32, flywheel 33, clutch 34, electric machine 36, electronic control system (ECS) 40, air handling subsystem 50, aftertreatment system 60, energy storage system (ESS) 70, power electronics system 80, and a mechanical accessory drive (not illustrated). Air handling subsystem 50 may include one or more intake manifolds, exhaust manifolds, turbochargers, superchargers, air filters or other intake air and exhaust system components. In the illustrated embodiment, ESS 70 is configured as a high-voltage battery system. Other embodiments may include other types of battery systems or other power storage devices such as super-capacitors or ultra-capacitors.

In the illustrated embodiment aftertreatment system 60 includes a diesel oxidation catalyst (DOC) 62, a diesel particulate filter (DPF) 64 and an SCR catalyst 66 which are flow coupled in series. A reductant doser (not illustrated) is provided upstream of SCR catalyst and is configured to introduce reductant, such as diesel exhaust fluid (DEF), into the exhaust flow provided to SCR catalyst 66. One or more components of aftertreatment system 60, such as DPF 64, SCR catalyst 66 or both may include or may be otherwise thermally coupled with a heating element that may be selectably coupled with power electronics 80 by a switch 67 which is in operative communication with ECS 40 via CAN 99. The heating element or elements may be resistive heating elements infrared or other types of electrical heating elements. In certain forms, switch 67 may be structured to selectably couple one or more of multiple heating elements of aftertreatment system 60 with power electronics 80. In certain forms where only one heating element or one commonly actuated group of heating elements are utilized in aftertreatment system 60, switch 67 may be omitted.

In the illustrated embodiment hybrid power system 24 is in the form of a parallel hybrid system such that engine 32 and/or electric machine 36 can provide torque for hybrid powertrain system 22 depending on whether clutch 34 is engaged or not. It should be appreciated that electric machine 36 can operate as a motor powered by electricity from ESS 70, or as an electric power generator that captures electric energy. In other operating modes, motor/generator may be passive such that it is not providing torque to the driveline. In the depicted form, electric machine 36 has a common rotor and a common stator, and provided as an integrated single unit; however, in other embodiments, a completely or partially separate motor, generator, rotor, stator, or the like may be integrated with a diesel engine. The designated electric machine 36 is intended to encompass such variations. Furthermore, it should be appreciated that in alternative embodiments of hybrid power system 24 some of the illustrated features may be absent and/or other optional devices and subsystems may be included (not shown).

For the depicted embodiments, engine 32 is of a four-stroke, diesel-fueled, Compression Ignition (CI) type with multiple cylinders and corresponding reciprocating pistons coupled to a crankshaft which is coupled to a flywheel that is coupled to a controllable clutch. Engine 32 may be of a conventional type with configuration and operation modifications to complement operation in hybrid power system 24. In other embodiments, engine 32 may be of a different type, including different fueling, different operating cycle(s), different ignition, or the like.

It should be appreciated that ECS 40 can be implemented in any of a number of ways which combine or distribute the control function across one or more control units in various manners. ECS 40 executes operating logic that defines various control, management, and/or regulation functions. This operating logic may be in the form of dedicated hardware, such as a hardwired state machine, analog calculating machine, programming instructions, and/or a different form as would occur to those skilled in the art. ECS 40 may be provided as a single component or a collection of operatively coupled components; and may be comprised of digital circuitry, analog circuitry, or a hybrid combination of both of these types. When of a multi-component form, ECS 40 may have one or more components remotely located relative to the others in a distributed arrangement. ECS 40 can include multiple processing units arranged to operate independently, in a pipeline processing arrangement, in a parallel processing arrangement, or the like. In one embodiment, ECS 40 includes several programmable microprocessing units of a solid-state, integrated circuit type that are disturbed throughout hybrid powertrain system 22 that each include one or more processing units and memory. For this embodiment, ECS 40 is operatively coupled with various components and systems of the vehicle 20 via a controller area network (CAN) 99.

It shall be appreciated that ECS 40 may be implemented in a number of physically separate devices, such as microprocessor-based or microcontroller-based electronic control modules which are sometimes referred to as electronic control units. For example, an engine control unit (ECU) may be provided to control operation of engine 32, air handling system 50, and aftertreatment system 60 among other components and systems. A transmission control unit (TCU) may be provided to control operation of transmission 26. A hybrid control unit (HCU) may be provided to control operation of electric machine 36 and/or power electronics system 80. A battery control unit (BCU) may be provided to control operation of ESS 70 when configured as a battery. A variety of other electronic control modules or electronic control units may be provided to control operation of other actuators, components, sensors and systems of the vehicle 20. Each of the electronic control modules or electronic control units may be operatively coupled with and may communicate with one another via CAN 99.

It shall be further appreciated that ECS 40 and/or any of its constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications.

Figure 2:
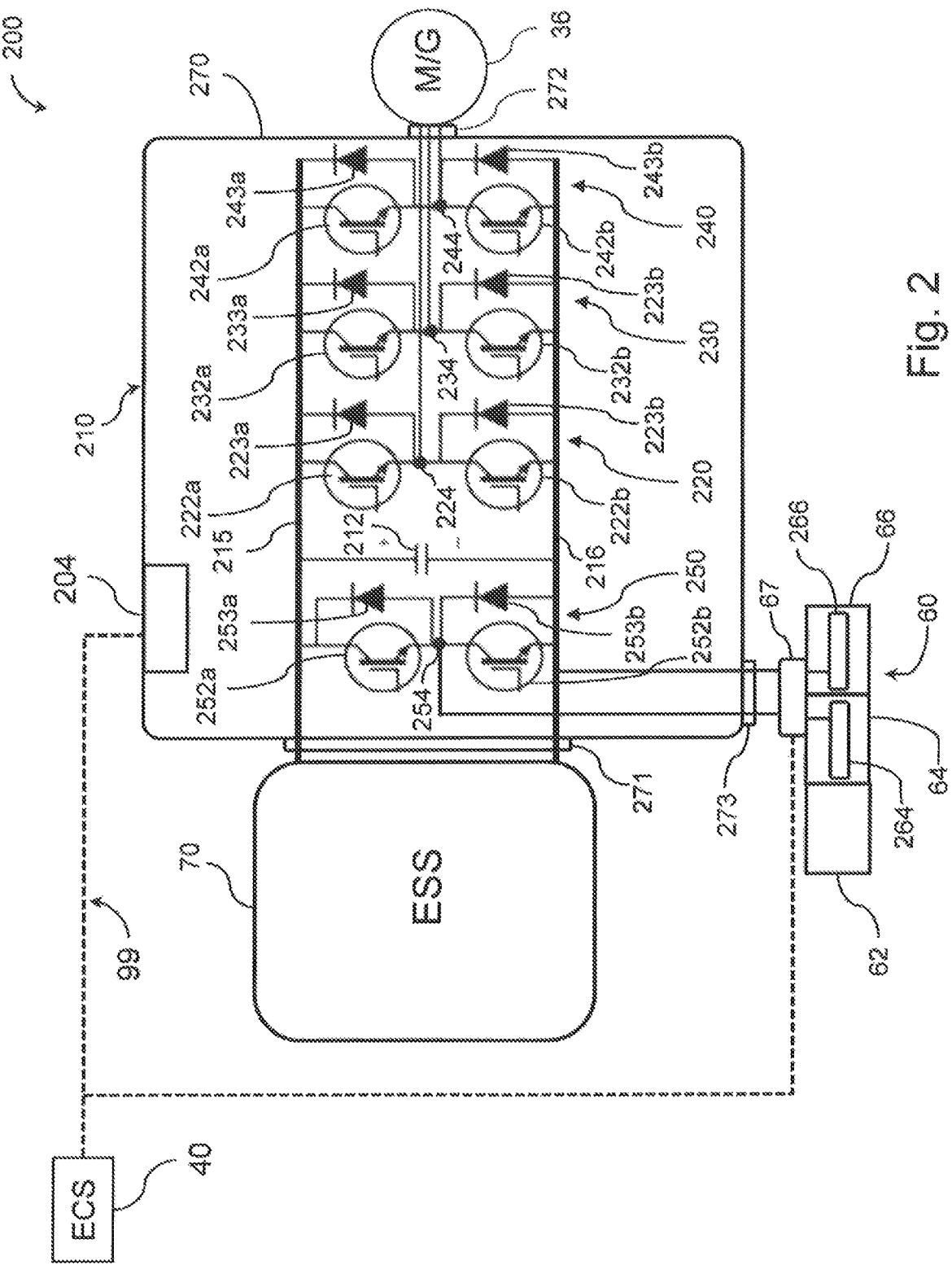
FIG. 2 is a schematic diagram illustrating certain aspects of an exemplary inverter-based aftertreatment thermal management system which may be provided in a vehicle system such as the vehicle system illustrated in FIG. 1

With reference to FIG. 2, there is illustrated a schematic diagram depicting certain aspects of an exemplary inverter-based aftertreatment thermal management system 200 (sometimes referred to herein as system 200) which may be implemented in a hybrid power system such as hybrid power system 24. For purposes of illustration, system 200 is depicted and described in relation to certain components of hybrid power system 24; however, it shall be appreciated that system 200 may be implemented in a variety of other types of hybrid power systems.

System 200 includes an inverter module 210 which may be implemented as a part of a power electronics system such as power electronics system 80. In the illustrated embodiment, inverter module 210 comprises a housing 270 containing electrical components of inverter module 210 which include inverter phase legs 220, 230 and 240, first DC rail 215 and second DC rail 216, a DC link capacitor 212, and an auxiliary leg 250. In the illustrated embodiment inverter module 210 is provided as a three-phase inverter comprising three inverter phase legs, however, it shall be appreciated that inverters with a different number of inverter phase legs may also be utilized.

Phase leg 220, 230 and 240 respectively include first switching devices 222a, 232a, and 242a which are coupled to DC rail 215 and respective phase leg input/output nodes 224, 234, and 244, and second switching devices 222b, 232b, and 242b which are coupled to DC rail 216 and respective phase leg input/output nodes 224, 234, and 244. Fir Phase legs 220, 230 and 240 also respectively include first antiparallel diodes 223a, 233a, and 243a which are coupled to DC rail 215 and respective phase leg input/output nodes 224, 234, and 244, and second antiparallel diodes 223b, 233b, and 243b which are coupled to DC rail 216 and respective phase leg input/output nodes 224, 234, and 244. First switching devices 222a, 232a, and 242a and second switching devices 222b, 232b, and 242b may be any of a variety of types of power electronic devices, for example, semiconductor devices such as IGBTs, MOSFETS, SiC, or other types of semiconductor devices.

Auxiliary leg 250 includes switching device 252a which is coupled with DC rail 215 and auxiliary output node 254 and switching device 252b which is coupled with auxiliary output node 254 and DC rail 216. Switching devices 252a and 252b may be any of a variety of types of power electronic devices, for example, semiconductor devices such as IGBTs, MOSFETS, SiC, or other types of semiconductor devices. In certain embodiments, switching device 252b may be omitted and auxiliary leg 250 may operate using only switching device 252a.

A number of power couplings are provided to electrically connect the electrical components of inverter module 210 contained in housing 270 with other components. Power coupling 271 provides an electrical connection between ESS 70 and DC rail 215 and DC rail 216. Power coupling 272 provides an electrical connection between electric machine 36 and phase leg input/output nodes 224, 234, and 244. Power coupling 273 provides an electrical connection between aftertreatment system 60 and auxiliary output node 254 and DC rail 216. In the illustrated embodiment, second power coupling 272 and third power coupling 273 are depicted at separate locations on inverter module 210. It should be appreciated, however, that second power coupling 272 and third power coupling 273 may be provided in location as components of a multiport power coupling.

Inverter module 210 includes an inverter controller 204 which is in operative communication with other components of ECS 40 via CAN 99 and, for some purposes, may be considered a distributed component of ECS 40. Inverter controller 204 is operable to control the operation of inverter module 210 in response to higher-level operation commands received from other components of ECS 40. For example, in response to a command associated with the operation of electric machine 36 as a motor, such as a command to provide traction torque for a powertrain, inverter controller 204 operates the switching devices of phase legs 220, 230, and 240 to convert DC power provided by ESS 70 to DC rails 215 and 216 to AC power output at phase leg input/output nodes 224, 234, and 244 to drive electric machine 36.

In another example, in response to a command associated with the operation of electric machine 36 as a generator, such as a command to provide regenerative braking, inverter controller 204 operates the switching devices of phase legs 220, 230, and 240 to convert AC power received at phase leg input/output nodes 224, 234, and 244 to DC power at DC rails 215 and 216. Under some operation conditions, DC power from DC rails 215 and 216 may be utilized to charge ESS 70. Under other operating conditions, DC power from DC rails 215 and 216 may be utilized by auxiliary leg 250 to heat one or more components of exhaust aftertreatment system 60. In such operating conditions, DC power may be selectably supplied to DC rails 215 and 216 by ESS 70, by the aforementioned operation of phase legs 220, 230, and 240, or by a combination of both sources.

As illustrated in the embodiment of FIG. 2, aftertreatment system 60 includes a first heating element 264 which provided in or otherwise thermally coupled with DPF 64 and a second heating element 266 which is provided in or otherwise thermally coupled with SCR catalyst 66. Heating elements 264 and 266 are electrically connected to switch 67 which is electrically connected with inverter module 210 and is in operatively coupled with ECS 40 via CAN 99. Switch 67 can be controlled by ECS 40 to electrically connect and disconnect one or both of heating elements 264 and 266 with inverter module 210. As noted above, in certain forms where only one heating element or one commonly actuated group of heating elements are utilized in aftertreatment system 60, switch 67 may be omitted.

Inverter controller 204 may operate switching devices 252a and 252b to provide power to one or more heating elements operatively coupled with one or more components of aftertreatment system 60 in a number of operating scenarios. For example, power generated by electric machine 36 during regenerative braking or motoring may be provided to one or more heating elements operatively coupled with a component of aftertreatment system 60 which is evaluated to be operating below a predetermined minimum operating temperature or temperature range. This may occur in combination with or instead of the use of power generated by electric machine 36 during regenerative braking or motoring to charge ESS 70. Additionally, if ESS 70 is evaluated to have sufficient energy, power from ESS 70 may be provided to one or more heating elements operatively coupled with a component of aftertreatment system 60 which is evaluated to be operating below a predetermined maximum temperature or temperature range regardless of whether power is generated by electric machine 36. Furthermore, power generated by electric machine 36 during regenerative braking or motoring may be provided to one or more heating elements operatively coupled with a component of aftertreatment system 60 which is evaluated to be below a predetermined maximum operating temperature when it is evaluated that ESS 70 is at a full charge capacity and cannot accept power generated by electric machine 36. Additionally, one or more heating elements operatively coupled with a component of aftertreatment system 60 may be utilized to receive discharge current from DC link capacitor 212 in order to render inverter module 210 safe for maintenance or repair.

Figure 3:
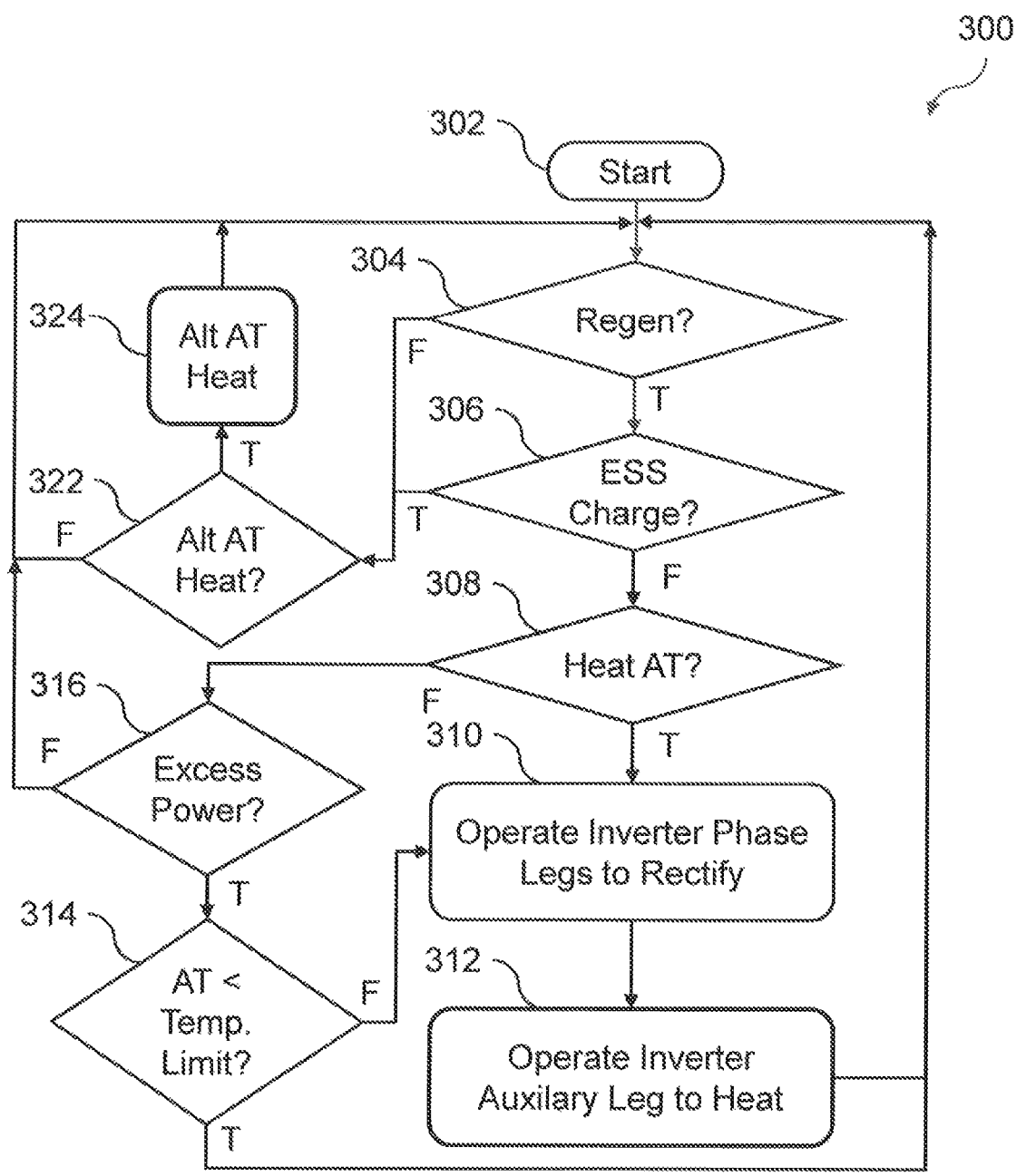
FIG. 3 is a flowchart illustrating an exemplary control process which may be performed in connection with an inverter-based aftertreatment thermal management system such as the exemplary system FIG. 2.

With reference to FIG. 3, there is illustrated a flowchart depicting certain aspects of an exemplary process 300 which may be performed in connection with an inverter-based aftertreatment thermal management system, such as system 200, and a hybrid powertrain system, such hybrid powertrain system 22. Process 300 is initiated at start operation 302 and proceeds to conditional 304 which determines if the hybrid powertrain system is operating in a regeneration mode. The regeneration mode may comprise a regenerative braking mode wherein an electric machine, such as electric machine 36, is operated as a generator to slow or stop a vehicle, such as vehicle 20, in response to an operator braking command, a motoring mode wherein an electric machine, such as electric machine 36, is operated as a generator to slow or maintain a desired speed of a vehicle, such as vehicle 20, for example during a hill descent, or another regeneration mode wherein an electric machine, such as electric machine 36, is operated as a generator.

If conditional 304 determines that the hybrid powertrain system is not operating in a regeneration mode, process 300 proceeds to conditional 322 which determines whether one or more aftertreatment system component should be heated and whether an alternative energy source is available to heat the one or more aftertreatment system component. The determination whether one or more aftertreatment system component should be heated may be based upon an evaluation of whether a current temperature or a predicted future temperature of an aftertreatment system component, such as one or more components of aftertreatment system 60, is below a predetermined minimum operating temperature or temperature range. The determination whether an alternative energy source is available to heat the one or more aftertreatment system component may be based upon an evaluation whether an energy storage system, such as ESS 70, has energy available for discharge based on a desired state of charge, state of health, temperature, or other operational or state parameters of ESS 70. If conditional 322 determines that one or more aftertreatment system component should not be heated or determines that an alternative energy source is not available, process 300 returns to conditional 304. If conditional 322 determines that one or more aftertreatment system components should be heated and that an alternative energy source is available, process 300 proceeds to operation 324 which heats the one or more aftertreatment system component with the alternative energy source, and then returns to conditional 304.

If conditional 304 determines that the hybrid powertrain system is operating in a regeneration mode, process 300 proceed to conditional 306 which determines whether an energy storage system, such as energy storage system 70, should be charged using energy generated in the regen mode, and whether the charging need is such that the charging of the energy storage system must be given override priority to the exclusion of heating an aftertreatment system component. The determination whether an energy storage system should be charged may be based upon an evaluation of a number of operational states of parameters including, for example, state of charge, state of health, temperature, or other operational or state parameters of ESS 70. The determination whether the charging need is such that the charging of the energy storage system must be given override priority to the exclusion of heating an aftertreatment system component may be based upon an evaluation of the energy or power that would be consumed by the heating an aftertreatment system component and an evaluation whether the remaining energy of power is sufficient to meet the changing need of the energy storage system.

If conditional 306 determines that an energy storage system should be charged using energy generated in the regen mode and that the charging need is such that the charging of the energy storage system must be given override priority to the exclusion of heating an aftertreatment system component, process 300 proceeds to conditional 322 and continues as described above. If conditional 306 determines that an energy storage system should not be charged using energy generated in the regen mode, or that the charging need is not such that the charging of the energy storage system must be given override priority to the exclusion of heating an aftertreatment system component, process 300 proceeds to conditional 308.

Conditional 308 determines whether one or more aftertreatment system component should be heated. This determination may be based upon an evaluation of whether a current temperature or a predicted future temperature of an aftertreatment system component, such as one or more components of aftertreatment system 60, is below a predetermined minimum operating temperature or temperature range. If conditional 308 determines that one or more aftertreatment system component should be heated, process 300 proceeds to operation 310 which operates the switches of a plurality of inverter phase legs, such as the switches of inverter phase legs 220, 230, and 240, to rectify AC power received from an electric machine, such as electric machine 36, which is operating as a generator and to operation 312 which modulates one or more switches of an auxiliary leg, such as the switches of auxiliary leg 252, to power one or more heating elements operatively coupled with one or more components of an exhaust aftertreatment system, such as one or more components of exhaust aftertreatment system 60. While operations 310 and 312 are depicted sequentially for purposes of illustration and description, it shall be appreciated that they may be performed concurrently. Furthermore, in a systems which include a switch, such as switch 67, which is structured to selectably couple one or more of multiple heating elements of aftertreatment system with power electronics, operation 312 may provide a switch actuation command effective to operate the switch to couple one or more one or more of multiple heating elements of aftertreatment system with the auxiliary leg. The selection performed by operation 312 may be based upon an indication of one or more particular components of an aftertreatment system should be heated which may be determined and provided conditional 308.

If conditional 308 determines that one or more aftertreatment system components should not be heated, process 300 proceeds to conditional 316 which determines whether the power generated by the electric machine in the regeneration mode is in excess of the power that can be consumed by the energy storage system and/or other electrical loads which may receive power generated by the electric machine in the regeneration mode. If conditional 316 determines that the power generated by the electric machine in the regeneration mode is not in excess of the power that can be consumed by the energy storage system and/or other electrical loads, process 300 returns to conditional 304.

If conditional 316 determines that the power generated by the electric machine in the regeneration mode is in excess of the power that can be consumed by the energy storage system and/or other electrical loads, process 300 proceeds to conditional 314 which determines whether one or more components of an exhaust aftertreatment system, such as one or more components of aftertreatment system 60, is below a maximum temperature. This determination may be made based upon an evaluation of whether a current temperature or a predicted future temperature of an aftertreatment system component, such as one or more components of aftertreatment system 60, is below a predetermined maximum operating temperature or temperature range. If conditional 314 determines that one or more components of an exhaust aftertreatment system is not below a maximum temperature, process 300 returns to conditional 304. If conditional 314 determines that one or more components of an exhaust aftertreatment system is below a maximum temperature, process 300 proceeds to operation 310 and continues as described above.

Figure 4:
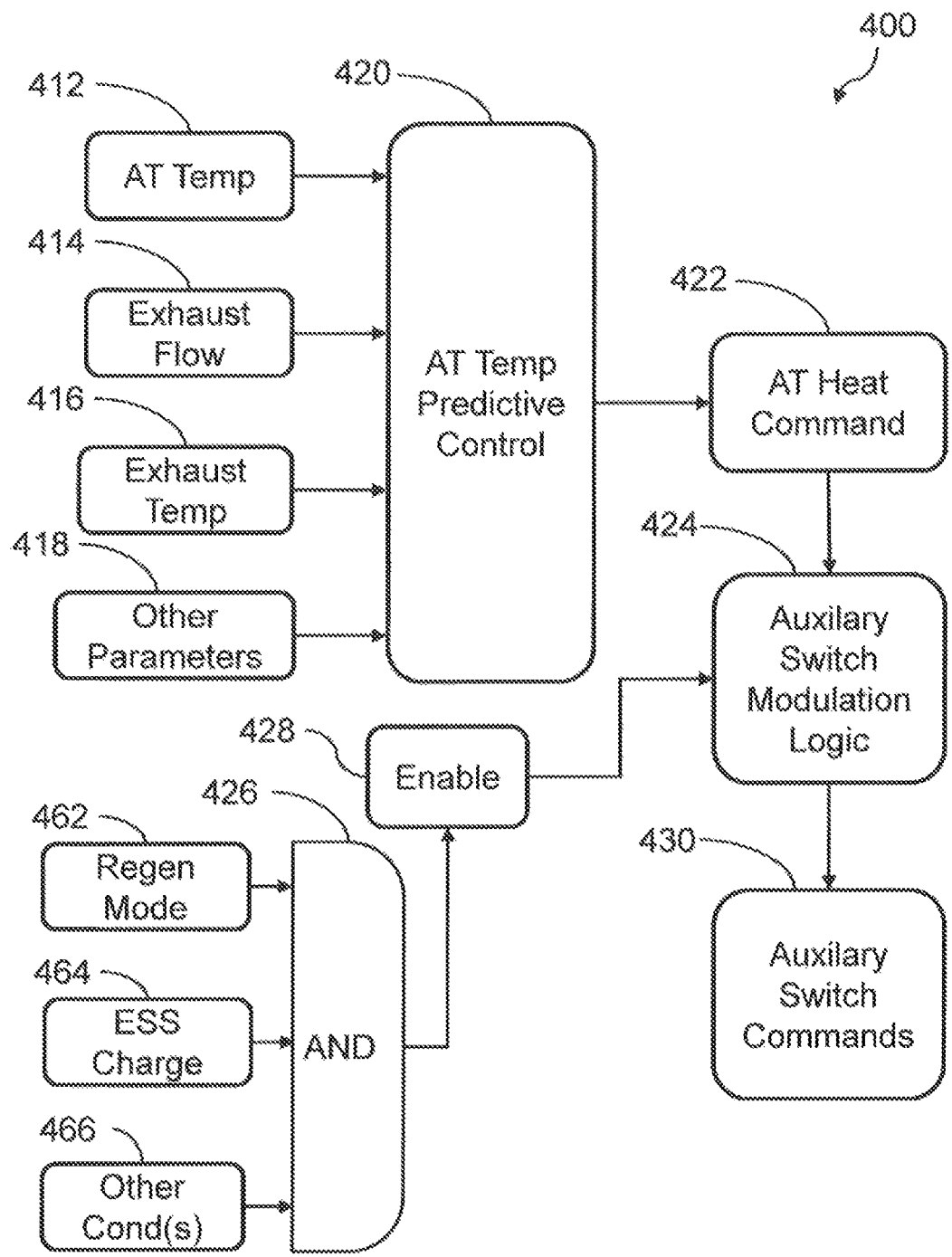
FIG. 4 is a block diagram illustrating exemplary controls which may be provided and operated in connection with an inverter-based aftertreatment thermal management system such as the exemplary system of FIG. 2.

With reference to FIG. 4, there is illustrated a block diagram depicting certain aspects of exemplary controls 400 which may be provided and operated in connection with an inverter-based aftertreatment thermal management system such as system 200. Block 420 includes aftertreatment temperature predictive control logic. Block 420 receives an aftertreatment temperature input from block 412. The temperature input may be one or more measured or estimated temperatures for one or more components of an aftertreatment system. Block 420 also receives an exhaust flow input from block 414 and an exhaust temperature input from block 416. Block 420 may also receive other parameters pertaining to current or future exhaust or aftertreatment conditions as indicated by block 418. Block 420 processes the inputs that it receives to determine whether one or more components of an aftertreatment system should be heated. This determination may be based upon an evaluation of whether a current temperature or a predicted future temperature of an aftertreatment system component, such as one or more components of aftertreatment system 60, is below a predetermined minimum operating temperature or temperature range. The future operating temperature may be predicted based upon the inputs from blocks 412, 414, 416, and 418.

Block 420 provides a logical output based on the operations of its aftertreatment temperature predictive control logic to block 422 which generates an aftertreatment heat command. The aftertreatment heat command may include an identification of one or more components of an aftertreatment system that should be heated and a heating command which may be defined in terms of a heating magnitude and duration. The output of block 422 is provided to block 424 which utilizes auxiliary switch modulation logic to generate an output auxiliary switch commands 430 in response to the aftertreatment heat command received from block 422. An enable input 428 is also provided to block 424 to selectably enable or disable the generation of auxiliary switching command 430 depending on its logical value. The enable input 428 is generated by block 426 which implements a logical AND operation for inputs 462, 464, and 466. Input 462 provides a logical value indicating whether or not a system is operating in a regeneration mode. Input 464 provides a logical value for whether or not an energy storage system requires charging. Input 466 provides value for one or more other conditions which may be established as prerequisites to enabling block 424.

A number of exemplary embodiments shall now be further described. A first embodiment is a vehicle system comprising an engine configured to output torque to propel the vehicle system and to output exhaust to an exhaust aftertreatment system; an electric machine configured to selectably operate as a motor to provide torque to the vehicle system and as a generator to receive torque from the vehicle system; an inverter module including a plurality of inverter phase legs and an auxiliary leg, the plurality of inverter phase legs being operatively coupled with a first DC rail, a second DC rail, and the electric machine, the auxiliary leg being operatively coupled with the first DC rail, the second DC rail and a heating element provided in the exhaust aftertreatment system; and an electronic control system in operative communication with the inverter module and the exhaust aftertreatment system, the electronic control system being configured to: evaluate whether the electric machine is operating as a generator, selectably operate the plurality of inverter phase legs to rectify AC power received from the electric machine, evaluate whether to heat one or more components of the exhaust aftertreatment system, and selectably operate the auxiliary leg to provide rectified power from the inverter legs to one or more electrical heating elements thermally coupled with the one or more components exhaust aftertreatment system effective to heat the one or more components.

In certain forms of the first embodiment, the exhaust aftertreatment system comprises a selective catalytic reduction (SCR) catalyst and one or more of the electrical heating elements is thermally coupled with the SCR catalyst. In certain such forms, the exhaust aftertreatment system comprises a diesel particulate filter (DPF) and one or more of the electrical heating elements is thermally coupled with the DPF. In certain such forms, the electronic control system is configured to selectably couple neither, one, or both of the SCR catalyst and the DPF with the auxiliary leg during operation of the auxiliary leg to provide rectified power from the inverter legs.

In certain forms of the first embodiment, the electronic control system is configured to evaluate whether to heat one or more components of the exhaust aftertreatment system by evaluating whether the one or more components is below a predetermined temperature. In certain such forms, the electronic control system is configured to evaluate whether to heat one or more components of the exhaust aftertreatment system by evaluating whether an energy storage system can be charged and evaluating whether the one or more components is above a predetermined temperature.

In certain forms of the first embodiment, the electronic control system is configured to evaluate whether an energy storage system requires charging and, in response, to one of charge the energy storage system without operating the auxiliary leg to provide rectified power from the inverter legs to the one or more electrical heating elements thermally coupled with the one or more components exhaust aftertreatment system and concurrently charge the energy storage and operate the auxiliary leg to provide rectified power from the inverter legs to the one or more electrical heating elements thermally coupled with the one or more components exhaust aftertreatment system.

A second embodiment is a method comprising providing a vehicle system including an engine configured to output torque to propel the vehicle system and to output exhaust to an exhaust aftertreatment system, an electric machine configured to selectably operate as a motor to provide torque to the vehicle system and as a generator to receive torque from the vehicle system, an inverter module including a plurality of inverter phase legs and an auxiliary leg, the plurality of inverter phase legs being operatively coupled with a first DC rail, a second DC rail, and the electric machine, the auxiliary leg being operatively coupled with the first DC rail, the second DC rail and a heating element provided in the exhaust aftertreatment system, and an electronic control system in operative communication with the inverter module and the exhaust aftertreatment system; evaluating with the electronic control system whether the electric machine is operating as a generator, selectably controlling with the electronic control system the plurality of inverter phase legs to rectify AC power received from the electric machine, evaluating with the electronic control system whether to heat one or more components of the exhaust aftertreatment system, and selectably operate with the electronic control system the auxiliary leg to provide rectified power from the inverter legs to one or more electrical heating elements thermally coupled with the one or more components exhaust aftertreatment system effective to heat the one or more components.

In certain forms of the second embodiment, the exhaust aftertreatment system comprises a selective catalytic reduction (SCR) catalyst and one or more of the electrical heating elements is thermally coupled with the SCR catalyst. In certain such forms, the exhaust aftertreatment system comprises a diesel particulate filter (DPF) and one or more of the electrical heating elements is thermally coupled with the DPF. Certain such forms comprise operating the electronic control system to selectably couple neither, one, or both of the SCR catalyst and the DPF with the auxiliary leg during operation of the auxiliary leg to provide rectified power from the inverter legs.

In certain forms of the second embodiment, the act of evaluating with the electronic control system whether to heat one or more components of the exhaust aftertreatment comprises evaluating whether the one or more components is below a predetermined temperature. In certain such forms, the act of evaluating with the electronic control system whether to heat one or more components of the exhaust aftertreatment comprises evaluating whether an energy storage system can be charged and evaluating whether the one or more components is above a predetermined temperature.

Certain forms of the second embodiment comprise evaluating with the electronic control system whether an energy storage system requires charging and, in response, operating the control system to one of charge the energy storage system without operating the auxiliary leg to provide rectified power from the inverter legs to the one or more electrical heating elements thermally coupled with the one or more components exhaust aftertreatment system and concurrently charge the energy storage and operate the auxiliary leg to provide rectified power from the inverter legs to the one or more electrical heating elements thermally coupled with the one or more components exhaust aftertreatment system.

A third embodiment is an apparatus for selectably providing power to and receiving power from a hybrid vehicle traction motor, the apparatus comprising a DC bus including a first DC rail, a second DC rail and a capacitor operatively coupled with the first DC rail and the second DC rail; a plurality of inverter phase legs each including a respective first switch operatively coupled with the first DC rail and operatively coupled with a respective traction motor input/output node and a respective second switch operatively coupled with the respective traction motor input/output node and operatively coupled with the second DC rail; and at least one auxiliary leg including an auxiliary leg switch operatively coupled with the first DC rail and operatively coupled with a resistive heating element, the resistive heating element being operatively coupled with the auxiliary leg switch and operatively coupled with the second DC rail and being configured to thermally interface with and selectably transfer heat to an exhaust aftertreatment system component.

In certain forms of the third embodiment, the resistive element is thermally coupled with an SCR catalyst. In certain such forms, the resistive element dissipates heat from a regeneration energy generated by an electric machine when a high voltage battery cannot absorb the regeneration energy. In certain such forms, the resistive element is actuated by the auxiliary leg switch of the inverter based on a predetermined temperature of the exhaust aftertreatment system component. Certain such forms comprise an electronic control system configured to control operation of the plurality of inverter phase legs to convert AC power received at the respective input/output nodes to DC power provided to the DC bus and to control the auxiliary leg switch to heat the resistive heating element. Certain such forms comprise an apparatus including any of the foregoing features.

In certain forms of the third embodiment, the resistive element dissipates heat from a regeneration energy generated by an electric machine when a high voltage battery cannot absorb the regeneration energy.

In certain forms of the third embodiment, the resistive element is actuated by the auxiliary leg switch of the inverter based on a predetermined temperature of the exhaust aftertreatment system component.

Certain forms of the third embodiment, comprise an electronic control system configured to control operation of the plurality of inverter phase legs to convert AC power received at the respective input/output nodes to DC power provided to the DC bus and to control the auxiliary leg switch to heat the resistive heating element.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A vehicle system comprising:
an engine configured to output torque to propel the vehicle system and to output exhaust to an exhaust aftertreatment system, the exhaust aftertreatment system including one or more heating elements;
an electric machine configured to selectably operate as a motor to provide torque to the vehicle system and as a generator to receive torque from the vehicle system;
an inverter module including a plurality of inverter phase legs and an auxiliary leg, the plurality of inverter phase legs being operatively coupled with a first DC rail, a second DC rail, and the electric machine, the auxiliary leg being operatively coupled with the first DC rail and the second DC rail and including an output node intermediate and selectably operatively coupleable with the first DC rail and the second DC rail by operation of a first auxiliary leg switch operatively coupled with the first DC rail and the output node and a second auxiliary leg switch operatively coupled with the second DC rail and the output node, the output node being operatively coupled with the one or more electrical heating elements in the exhaust aftertreatment system, the inverter module further including a capacitor connected to the first DC rail and the second DC rail to output discharge current from the inverter module to the one or more electrical heating elements; and
an electronic control system in operative communication with the inverter module and the exhaust aftertreatment system, the electronic control system being configured to:
evaluate whether the electric machine is operating as the generator,
selectably operate the plurality of inverter phase legs to rectify AC power received from the electric machine,
evaluate whether to heat one or more components of the exhaust aftertreatment system, and
selectably operate at least one of the first and second auxiliary leg switches to receive rectified power from the plurality of inverter phase legs through each of the first DC rail and the second DC rail, and to provide the rectified power from the first DC rail and the second DC rail to the one or more electrical heating elements thermally coupled with the one or more components of the exhaust aftertreatment system effective to heat the one or more components.

2. The system of claim 1 wherein the exhaust aftertreatment system comprises a selective catalytic reduction (SCR) catalyst and the one or more of the electrical heating elements is thermally coupled with the SCR catalyst.

3. The system of claim 2 wherein the exhaust aftertreatment system comprises a diesel particulate filter (DPF) and the one or more of the electrical heating elements is thermally coupled with the DPF.

4. The system of claim 3 wherein the electronic control system is configured to provide rectified power to one of the SCR catalyst and the DPF from the plurality of inverter phase legs during operation of the auxiliary leg and to operate an other switch to selectably couple both of the SCR catalyst and the DPF with the auxiliary leg during operation of the auxiliary leg to provide rectified power from the plurality of inverter phase legs.

5. The system of claim 1 wherein the electronic control system is configured to evaluate whether to heat the one or more components of the exhaust aftertreatment system by evaluating whether the one or more components is below a predetermined temperature.

6. The system of claim 5 wherein the electronic control system is configured to evaluate whether to heat the one or more components of the exhaust aftertreatment system by evaluating whether an energy storage system can be charged and evaluating whether the one or more components is above a predetermined temperature.

7. The system of claim 1 wherein the electronic control system is configured to evaluate whether an energy storage system requires charging and, in response, to perform one of: charge the energy storage system without operating the auxiliary leg to provide rectified power from the inverter legs to the one or more electrical heating elements thermally coupled with the one or more components exhaust aftertreatment system or concurrently charge the energy storage system and operate the auxiliary leg to provide rectified power from the plurality of inverter phase legs to the one or more electrical heating elements thermally coupled with the one or more components-of the exhaust aftertreatment system.

8. The system of claim 1, wherein the inverter module includes a housing containing the plurality of inverter phase legs and the auxiliary leg.

9. A method comprising:
providing a vehicle system including an engine configured to output torque to propel the vehicle system and to output exhaust to an exhaust aftertreatment system that includes one or more electrical heating elements, an electric machine configured to selectably operate as a motor to provide torque to the vehicle system and as a generator to receive torque from the vehicle system, an inverter module including a plurality of inverter phase legs and an auxiliary leg, the plurality of inverter phase legs being operatively coupled with a first DC rail, a second DC rail, and the electric machine, the auxiliary leg being operatively coupled with the first DC rail, the second DC rail and the one or more electrical heating elements in the exhaust aftertreatment system, the inverter module further including a capacitor connected to the first DC rail and the second DC rail, and an electronic control system in operative communication with the inverter module and the exhaust aftertreatment system;
evaluating with the electronic control system whether the electric machine is operating as the generator,
selectably controlling with the electronic control system the plurality of inverter phase legs to rectify AC power received from the electric machine,
evaluating with the electronic control system whether to heat one or more components of the exhaust aftertreatment system,
selectably operate with the electronic control system with a switching device set including a first switch and a second switch in the auxiliary leg to receive rectified power from the plurality of inverter phase legs through each of the first DC rail and the second DC rail via an output node intermediate and selectably operatively coupleable with the first DC rail and the second DC rail by operation the switching device set, and to provide the rectified power from the first DC rail and the second DC rail to the one or more electrical heating elements thermally coupled with the one or more components of the exhaust aftertreatment system effective to heat the one or more components, and
outputting discharge current from the inverter module from the capacitor to the one or more electrical heating elements.

10. The method of claim 9 wherein the exhaust aftertreatment system comprises a selective catalytic reduction (SCR) catalyst and the one or more of the electrical heating elements is thermally coupled with the SCR catalyst.

11. The method of claim 10 wherein the exhaust aftertreatment system comprises a diesel particulate filter (DPF) and the one or more of the electrical heating elements is thermally coupled with the DPF.

12. The method of claim 11 comprising operating the electronic control system to provide rectified power to one of the SCR catalyst and the DPF from the plurality of inverter phase legs during operation of the auxiliary leg and to operate an other switch to selectably couple both of the SCR catalyst and the DPF with the auxiliary leg during operation of the auxiliary leg to provide rectified power from the plurality of inverter phase legs.

13. The method of claim 9 wherein the act of evaluating with the electronic control system whether to heat the one or more components of the exhaust aftertreatment system comprises evaluating whether the one or more components is below a predetermined temperature.

14. The method of claim 13 wherein the act of evaluating with the electronic control system whether to heat the one or more components of the exhaust aftertreatment system comprises evaluating whether an energy storage system can be charged and evaluating whether the one or more components is above a predetermined temperature.

15. The method of claim 9 comprising evaluating with the electronic control system whether an energy storage system requires charging and, in response, operating the control system to perform one of: charge the energy storage system without operating the auxiliary leg to provide rectified power from the inverter legs to the one or more electrical heating elements thermally coupled with the one or more components exhaust aftertreatment system or concurrently charge the energy storage system and operate the auxiliary leg to provide rectified power from the plurality of inverter phase legs to the one or more electrical heating elements thermally coupled with the one or more components of the exhaust aftertreatment system.

16. An apparatus for selectably providing power to and receiving power from a hybrid vehicle traction motor, the apparatus comprising:
a DC bus including a first DC rail, a second DC rail and a capacitor operatively coupled with the first DC rail and the second DC rail;
a plurality of inverter phase legs each including a respective first switch operatively coupled with the first DC rail and operatively coupled with a respective traction motor input/output node and a respective second switch operatively coupled with the respective traction motor input/output node and operatively coupled with the second DC rail; and
at least one auxiliary leg including a first auxiliary leg switch operatively coupled with the first DC rail and operatively coupled with an output node that is operatively coupled with a resistive heating element, a second auxiliary leg switch operatively coupled with the second DC rail and operatively coupled with the output node, the resistive heating element being selectably operatively coupled with the first DC rail by operation of the first auxiliary leg switch and selectably operatively coupled with the second DC rail by operation of second auxiliary leg switch, wherein the resistive heating element receives rectified power from the first DC rail and the second DC rail and is configured to thermally interface with and selectably transfer heat to an exhaust aftertreatment system component, the resistive heating element further being operatively coupled to receive discharge current from the capacitor.

17. The apparatus of claim 16 wherein the resistive element is thermally coupled with an SCR catalyst.

18. The apparatus according to claim 16 wherein the resistive element dissipates heat from a regeneration energy generated by an electric machine when a high voltage battery cannot absorb the regeneration energy.

19. The apparatus according to claim 16 wherein the resistive element is actuated by at least one of the first and second auxiliary leg switches of the inverter based on a predetermined temperature of the exhaust aftertreatment system component.

20. The apparatus of claim 16 comprising an electronic control system configured to control operation of the plurality of inverter phase legs to convert AC power received at the respective input/output nodes to DC power provided to the DC bus and to control at least one of the first and second auxiliary leg switches to heat the resistive heating.

21. A vehicle system comprising the apparatus of claim 16.

* * * * *